Oct. 21, 1952 — G. M. DUCKWORTH — 2,614,555
STEAM GENERATOR
Filed Feb. 16, 1950
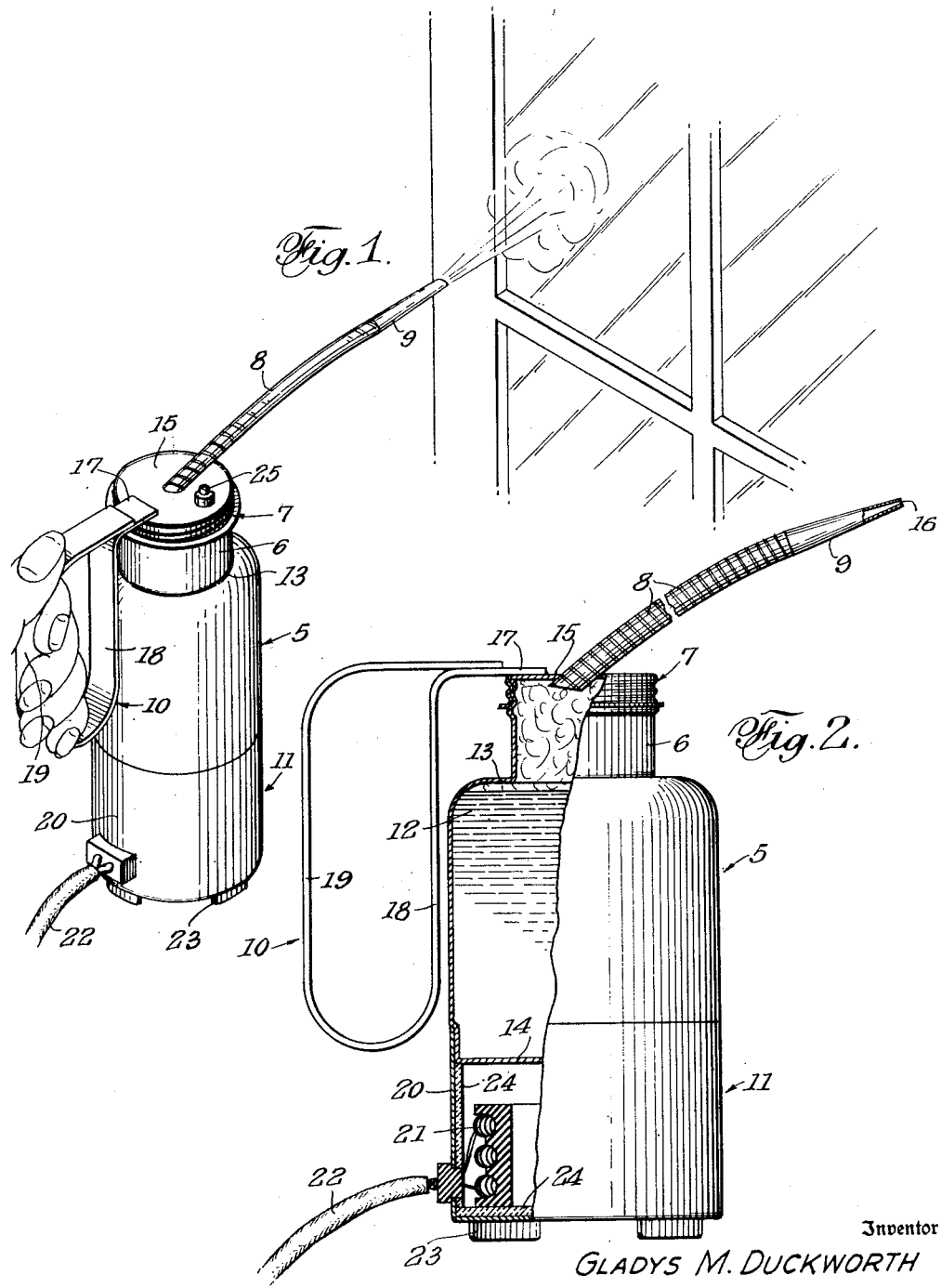
Inventor
GLADYS M. DUCKWORTH
By C. G. Stratton
Attorney

Patented Oct. 21, 1952

2,614,555

UNITED STATES PATENT OFFICE 2,614,555

STEAM GENERATOR

Gladys Marie Duckworth, Laguna Beach, Calif.

Application February 16, 1950, Serial No. 144,409

1 Claim. (Cl. 126—271.1)

This invention relates to a steam generating device for the more particular purpose of cleaning windows and the like.

An object of the present invention is to provide novel and improved means whereby window cleaning is greatly facilitated and obviates the need for swabbing cloths or sponges and the attending use of large quantities of water and soap or detergents. Window cleaning is thereby rendered a clean operation rather than one in which mopping up of water spillage and drippings is required.

Another object of the invention is to provide a novel steam generator of small portable form whereby steam is made constantly available to the user for window cleaning and like purposes.

A further object of the invention is to provide a steam generator for the purposes indicated that is safe to handle and, while of small size, affords a large steam output.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a perspective view of a steam generator according to the present invention and shown in operation.

Fig. 2 is an enlarged elevational view, partly in vertical section, of the present steam generator.

The steam generator that is illustrated comprises, generally, a liquid container 5 having a somewhat constricted open upper end 6, a closure cap 7 for said upper end, a flexible spout 8 extending from said closure and terminating in a nozzle 9, a handle 10 for the generator and carried by the closure cap, and an electric heater 11 affixed to the bottom of container 5 for heating the same and, therefore, the liquid 12 in the container.

The container 5 preferably has a capacity of between three-quarters and one pint of liquid to the shoulder 13 that defines the bottom of constricted end 6, said shoulder being provided to mark the filling level of the container. Thus, end 6 constitutes a steam chamber above the liquid in the container. The bottom 14 of the container receives heat from heater 11 and transmits the same to the liquid which, preferably, comprises water in which a small amount—about a teaspoonful—of ammonia is contained.

The cap 7 is threadedly connected to end 6 in a manner to effect a steam-tight seal, the cap wall 15 comprising the top of the mentioned steam chamber.

Spout 8 comprises a suitable length of flexible metallic hose that extends through cap wall 15 and into communication with the steam chamber, the hose being preferably disposed at an angle relative to said wall 15 so as to extend at an upward angle radially from the cap. Nozzle 9 extends from the free end of the spout and is conically constricted to provide a somewhat flattened discharge orifice 16. It will be seen that the spout may be flexed as desired to present the nozzle in any desired direction while the generator itself is maintained generally upright, thus insuring only passage of steam, and not liquid, through the nozzle.

The handle 10 is affixed to the cap and extends in a direction opposite to nozzle 8 so that the same, at all times, may be safely grasped without danger of encountering steam escaping from the nozzle. Said handle is formed as a downwardly directed loop that may be comfortably grasped to hold the generator upright or substantially so. Although the handle may be made of heat insulating material, by providing a relatively small overlap with cap wall 15, at 17, heat conduction to the handle is minimized and the same may, therefore, be inexpensively made of flat metal stock so bent that a guard 18 is interposed between the hand that grasps handle part 19 and the wall of container 5.

The heater 11 comprises a housing 20 that is formed as a lower extension of container 5, and an electric heating unit 21 disposed within said housing. The latter unit is supplied with electric current by suitable electric conductors arranged as an elongated extension cord or cable 22. Any available electric socket may serve cord 22. Unit 21 may vary, as desired, so long as the same generates enough heat to evaporate liquid 12 and to generate steam therefrom.

Suitable feet 23 may be provided on housing 20 to space the same from a support surface and to obviate transmission of heat to said housing, the inside thereof may be lined with heat insulation 24.

After generation of steam has been instituted, it is a simple matter to hold the generator so that nozzle 16 directs steam onto a window pane as indicated in Fig. 1. The steam condensate that results will loosen and suspend dirt and dust which can then easily be wiped off with a pad of cheesecloth or other suitable material.

In practice, I have found that, while the wiping cloth becomes soiled by the dirt that is removed, the same remains quite dry, enabling continuous deposit of steam and wiping away of the dirt-laden condensate. Thus, large areas may be cleaned quickly and with easy facility. The capacity of the generator is such that even the windows of a large home can be cleaned with a single filling of container 5.

Should more steam be generated than can find egress from orifice 16 with a resultant undue increase of pressure in the chamber above the liquid 12, the same may be vented by a suitable safety valve 25 provided in cap wall 15.

While the invention that has been illustrated and described is now regarded as the preferred embodiment, the construction is, of course, subject to modification without departing from the spirit and scope of the invention. It is therefore not desired to restrict the invention to the particular form of construction illustrated and described, but to cover all modifications that may fall within the scope of the appended claim.

Having thus described the invention, what is claimed and desired to be secured by Letters Patent is:

A steam generator comprising a container for liquid and having a constricted open upper end, said end defining a shoulder with the adjacent portion of the container and said shoulder marking the level to which the container is to be filled with liquid, a heater at the lower end of the container for heating liquid therein to generate steam occupying said upper end, a closure cap for the upper end, a flexible spout terminating in a nozzle and carried by the closure cap for conducting steam outward of the chamber, and a handle, also carried by the closure cap and extending laterally therefrom in a direction opposite to that of the spout, whereby the generator is adapted to be manually supported from a point remote from the discharge of steam.

GLADYS MARIE DUCKWORTH.

REFERENCES CITED

The following references are of record in the file of this patent:

UNITED STATES PATENTS

| Number | Name | Date |
|---|---|---|
| 105,192 | Gleason | July 12, 1870 |
| 546,504 | Blaisdell | Sept. 17, 1895 |
| 592,746 | Schwarz | Oct. 26, 1897 |
| 620,079 | Terrell | Feb. 21, 1899 |
| 682,762 | Souder et al. | Sept. 17, 1901 |
| 719,277 | Trenner | Jan. 27, 1903 |
| 837,877 | Orcutt et al. | Dec. 4, 1906 |
| 1,011,022 | Broderick | Dec. 5, 1911 |
| 1,037,623 | Hinsky | Sept. 3, 1912 |
| 1,920,330 | Towns | Aug. 1, 1933 |
| 2,223,780 | Carathers | Dec. 3, 1940 |
| 2,296,814 | Ebert | Sept. 22, 1942 |

FOREIGN PATENTS

| Number | Country | Date |
|---|---|---|
| 6,842 | Great Britain | of 1888 |